(12) United States Patent
Ansari et al.

(10) Patent No.: US 8,702,372 B2
(45) Date of Patent: *Apr. 22, 2014

(54) SYSTEM AND METHOD FOR ADJUSTING COMPRESSOR INLET FLUID TEMPERATURE

(75) Inventors: Adil Ansari, Kennesaw, GA (US); Rahul Jaikaran Chillar, Marietta, GA (US)

(73) Assignee: BHA Altair, LLC, Franklin, TN (US)

( * ) Notice: Subject to any disclaimer, the term of this patent is extended or adjusted under 35 U.S.C. 154(b) by 1024 days.

This patent is subject to a terminal disclaimer.

(21) Appl. No.: 12/772,626

(22) Filed: May 3, 2010

(65) Prior Publication Data

US 2011/0265443 A1    Nov. 3, 2011

(51) Int. Cl.
*F04D 27/00* (2006.01)
*F04D 29/58* (2006.01)

(52) U.S. Cl.
USPC .................. 415/1; 415/47; 415/118; 415/175

(58) Field of Classification Search
USPC ......... 415/1, 17, 26, 47, 48, 49, 50, 116, 118, 415/175
See application file for complete search history.

(56) References Cited

U.S. PATENT DOCUMENTS

| | | | |
|---|---|---|---|
| 3,664,942 A | 5/1972 | Havas et al. | |
| 3,719,071 A | * 3/1973 | Hohenberg | 374/111 |
| 3,771,350 A | 11/1973 | Romans | |
| 4,058,975 A | 11/1977 | Gilbert et al. | |
| 4,655,607 A | 4/1987 | Kern et al. | |
| 4,710,095 A | 12/1987 | Freberg et al. | |
| 5,099,121 A | 3/1992 | Allen | |
| 5,308,162 A | 5/1994 | Amano et al. | |
| 5,336,996 A | 8/1994 | Rusnak | |
| 5,385,202 A | 1/1995 | Drosdsiok et al. | |
| 5,883,815 A | 3/1999 | Drakulich et al. | |
| 6,031,231 A | 2/2000 | Kimata et al. | |
| 6,422,745 B1 | 7/2002 | Glasheen et al. | |
| 6,644,095 B2 | 11/2003 | Van Mullekom et al. | |
| 6,748,733 B2 | 6/2004 | Tamaro | |
| 6,931,352 B2 | 8/2005 | Cryer et al. | |
| 6,931,857 B2 | 8/2005 | Irwin et al. | |

(Continued)

FOREIGN PATENT DOCUMENTS

| | | |
|---|---|---|
| JP | 8296453 | 11/1996 |
| JP | 2004170375 | 6/2004 |
| WO | 61181921 | 8/1986 |
| WO | WO0122045 | 3/2001 |

OTHER PUBLICATIONS

U.S. Appl. No. 12/328,145, filed Dec. 4, 2008.
Ansari et al., U.S. Appl. No. 12/718,932, filed Mar. 5, 2010.

(Continued)

*Primary Examiner* — Edward Look
*Assistant Examiner* — Jason Davis
(74) *Attorney, Agent, or Firm* — Reinhart Boerner Van Deuren P.C.

(57) ABSTRACT

A system includes a radiation detector array directed toward a fluid flow into a compressor. The radiation detector array is configured to output a signal indicative of a two-dimensional temperature profile of the fluid flow. The system also includes a controller communicatively coupled to the radiation detector array. The controller is configured to detect a temperature variation across the fluid flow based on the signal, and to adjust a parameter of a temperature control device to compensate for the detected temperature variation.

20 Claims, 6 Drawing Sheets

(56) References Cited

U.S. PATENT DOCUMENTS

| | | |
|---|---|---|
| 6,962,043 B2 | 11/2005 | Venkateswaran et al. |
| 6,983,603 B2 | 1/2006 | Macchia |
| 7,231,307 B2 | 6/2007 | Takei et al. |
| 7,322,359 B2 | 1/2008 | Ketchum |
| 7,332,716 B2 | 2/2008 | Hamrelius et al. |
| 7,422,365 B2 | 9/2008 | Chamberlain et al. |
| 7,484,369 B2 | 2/2009 | Myhre |
| 7,552,633 B2 | 6/2009 | Tokuyasu et al. |
| 7,617,686 B2 | 11/2009 | Lilley et al. |
| 7,974,739 B2 | 7/2011 | Nelson et al. |
| 8,167,483 B2 | 5/2012 | Jensen |
| 8,410,946 B2 | 4/2013 | Ansari et al. |
| 8,469,588 B2 * | 6/2013 | Chillar et al. ............... 374/124 |
| 2004/0076218 A1 | 4/2004 | Tamlinson et al. |
| 2006/0076426 A1 | 4/2006 | Schuetze et al. |
| 2006/0220888 A1 | 10/2006 | Germouni et al. |
| 2007/0251663 A1 | 11/2007 | Sheldon et al. |
| 2008/0166489 A1 | 7/2008 | Strock et al. |
| 2008/0298957 A1 * | 12/2008 | Chillar et al. ............... 415/177 |
| 2009/0055071 A1 * | 2/2009 | Way et al. ............... 701/100 |
| 2009/0056910 A1 | 3/2009 | Mallia et al. |
| 2009/0272122 A1 | 11/2009 | Shi et al. |
| 2009/0285259 A1 | 11/2009 | Allen et al. |
| 2010/0143090 A1 | 6/2010 | Smith et al. |
| 2011/0215936 A1 | 9/2011 | Ansari et al. |
| 2011/0240858 A1 | 10/2011 | Estevadeordal et al. |
| 2011/0265443 A1 | 11/2011 | Ansari et al. |
| 2011/0268149 A1 | 11/2011 | Chillar et al. |
| 2012/0031106 A1 | 2/2012 | Chillar et al. |
| 2012/0031581 A1 | 2/2012 | Chillar et al. |
| 2012/0032810 A1 | 2/2012 | Chillar et al. |

OTHER PUBLICATIONS

Chillar et al., U.S. Appl. No. 12/772,601, filed May 3, 2010.
Search Report from corresponding EP Application No. 11156999.2 dated Sep. 5, 2011.

* cited by examiner

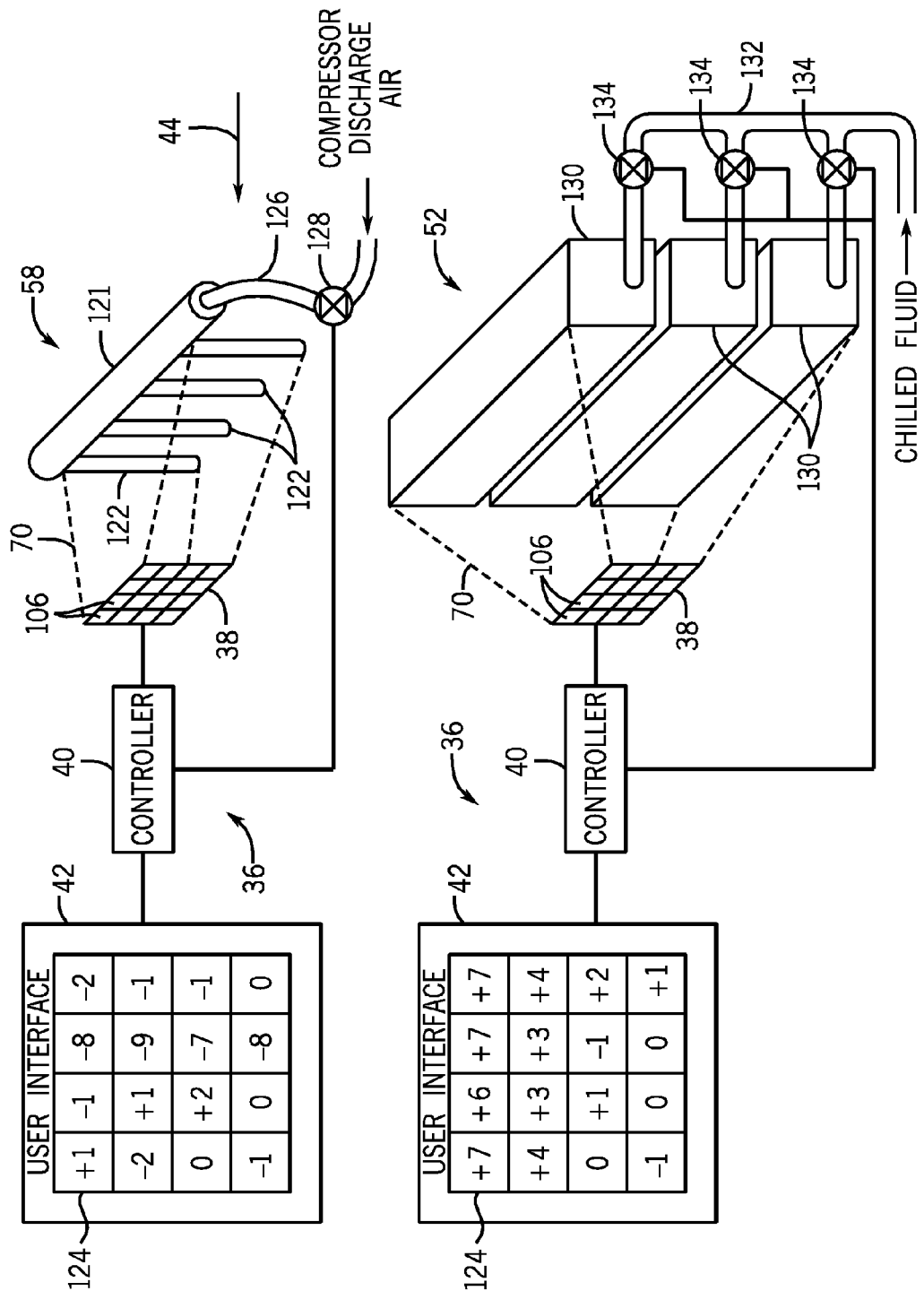

SYSTEM AND METHOD FOR ADJUSTING COMPRESSOR INLET FLUID TEMPERATURE

BACKGROUND OF THE INVENTION

The subject matter disclosed herein relates to a system and method for adjusting compressor inlet fluid temperature.

In general, gas turbine engines combust a mixture of compressed air and fuel to produce hot combustion gases. The combustion gases may flow through a turbine to generate power for a load and/or a compressor. The compressor compresses air through a series of stages, each stage having multiple blades rotating about a central shaft. As will be appreciated, temperature variations across an air flow into the compressor may produce an uneven air density distribution within the compressor. Consequently, the compressor blades may experience premature wear as the blades pass through regions of varying density. As a result, the useful life of compressor blades may be reduced compared to compressors which receive an air flow having a substantially uniform temperature distribution.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a radiation detector array directed toward a fluid flow into a compressor. The radiation detector array is configured to output a signal indicative of a two-dimensional temperature profile of the fluid flow. The system also includes a controller communicatively coupled to the radiation detector array. The controller is configured to detect a temperature variation across the fluid flow based on the signal, and to adjust a parameter of a temperature control device to compensate for the detected temperature variation.

In a second embodiment, a system includes an inlet configured to provide an air flow to a compressor, and a temperature control device in fluid communication with the inlet. The temperature control device is configured to vary a two-dimensional temperature profile of the air flow. The system also includes a radiation detector array directed toward a cross-section of the inlet downstream from the temperature control device and substantially perpendicular to a direction of the air flow. The radiation detector array is configured to output a signal indicative of the two-dimensional temperature profile of the air flow. The system further includes a controller communicatively coupled to the radiation detector array and the temperature control device. The controller is configured to detect a temperature variation across the air flow based on the signal, and to adjust a parameter of the temperature control device to compensate for the detected temperature variation.

In a third embodiment, a method includes measuring thermal radiation of an air flow into a compressor via a radiation detector array, and determining a two-dimensional temperature profile of the air flow based on the measurement. The method also includes detecting a temperature variation across the air flow based on the two-dimensional temperature profile, and adjusting a parameter of a temperature control device to compensate for the detected temperature variation.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 5 is a schematic of an embodiment of the thermal control system configured to adjust a flow of compressor discharge air into an inlet bleed heat system;

FIG. 6 is a schematic of an embodiment of the thermal control system configured to adjust a flow of chilled fluid into a chiller system.

DETAILED DESCRIPTION OF THE INVENTION

Figure 1:
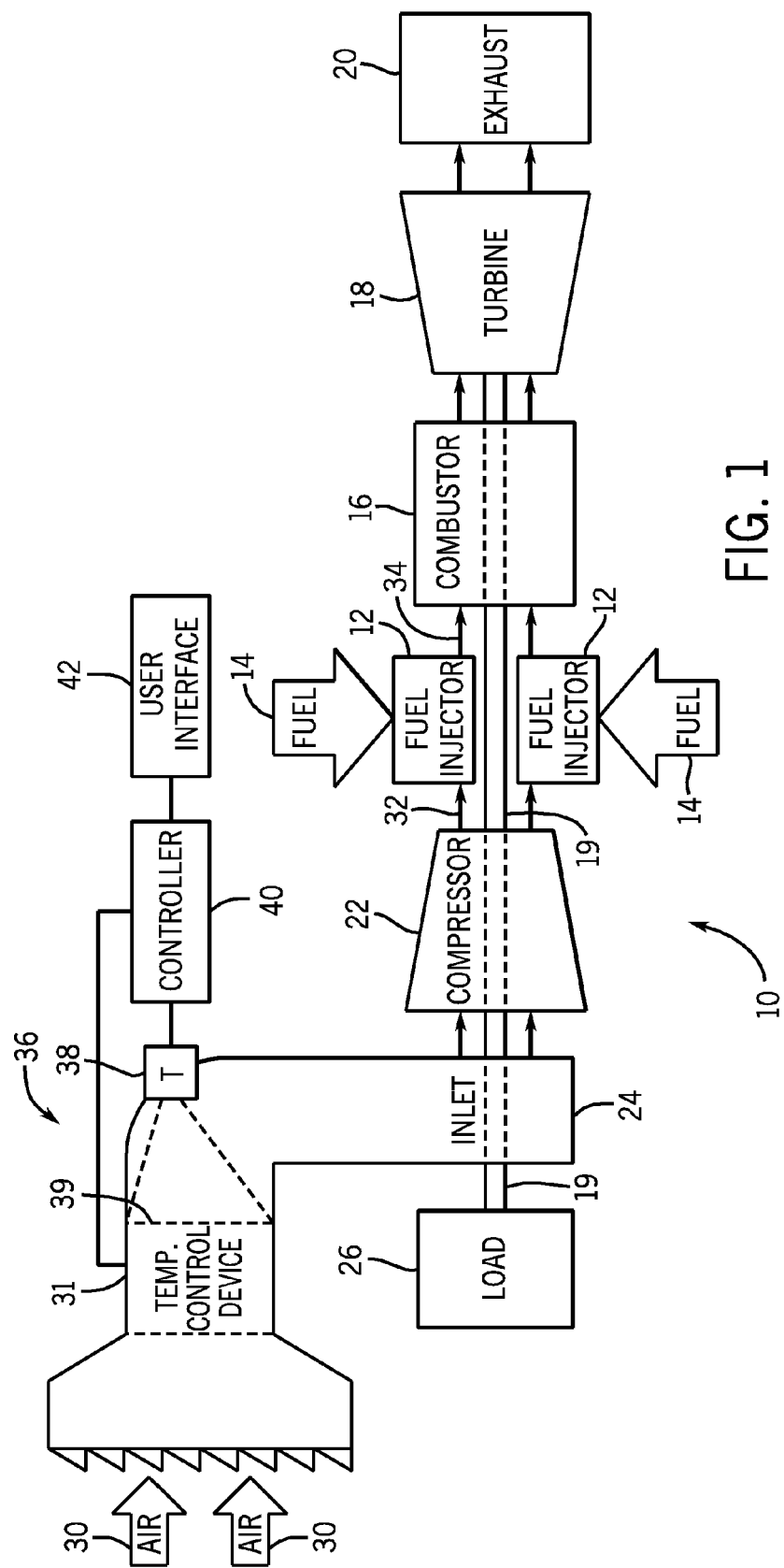
FIG. 1 is a block diagram of an embodiment of a gas turbine system including a thermal control system configured to adjust a temperature profile of an air flow into a compressor of the gas turbine system.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Temperature variations across an air flow into a gas turbine compressor may produce an uneven air density distribution within the compressor. Consequently, compressor blades may experience premature wear as the blades pass through regions of varying density. As a result, the useful life of compressor blades may be reduced compared to compressors which receive an air flow having a substantially uniform temperature distribution (e.g., temperature variations less than approximately 20, 17, 15, 12, 10, 8, 6, 4, or 2 degrees Fahrenheit, or less). Therefore, it may be desirable to monitor a temperature profile of the air flow into the compressor to detect an excessive temperature variation (e.g., a temperature variation greater than approximately 2, 4, 6, 8, 10, 12, 15, 17, or 20 degrees Fahrenheit, or more). For example, certain compressor inlets include multiple thermocouples in fluid communication with the air flow. If one thermocouple detects a temperature substantially different (e.g., outside of a range defined by the excessive temperature variation) from the temperature detected by the other thermocouples, then an operator may be informed of the condition so corrective action may be taken. Unfortunately, because thermocouples only measure the temperature of air in direct contact with the thermocouple, temperature variations between thermocouples may be undetected. Furthermore, employing a large number of thermocouples may be economically undesirable, and may obstruct the flow of air into the compressor.

If an excessive temperature variation is detected, the operator may deactivate the gas turbine engine to reduce the possibility of excessive compressor blade wear. In certain embodiments, the gas turbine engage may be used to generate electrical power within a power generation system. As will be appreciated, deactivating the gas turbine engine is such a situation may be economically undesirable due to the lost power generation capability. In addition, manually correcting the cause of the excessive temperature variation may be a time-consuming and labor-intensive process, thereby resulting in further economic loss.

Embodiments of the present disclosure may detect a temperature variation, such as an excessive temperature variation, across an air flow into a gas turbine compressor, and automatically compensate for the temperature variation, thereby maintaining continuous operation of the gas turbine engine. For example, certain embodiments include a thermal radiation detector array directed toward a fluid flow into a compressor. The thermal radiation detector array is configured to output a signal indicative of a two-dimensional temperature profile of the fluid flow. In addition, a controller, communicatively coupled to the thermal radiation detector array, is configured to detect an excessive temperature variation across the fluid flow based on the signal. The controller is also configured to adjust a parameter of a temperature control device to compensate for the detected excessive temperature variation. For example, the controller may be configured to detect the excessive temperature variation if a temperature difference between a region of the fluid flow and an average temperature of the fluid flow exceeds a threshold value. Alternatively, the controller may be configured to detect the excessive temperature variation if a temperature difference between a first region of the fluid flow and a second region of the fluid flow exceeds a threshold value. Because the thermal radiation detector array may monitor the entire two-dimensional cross-section of the fluid flow, substantially all temperature variations within the fluid flow may be detected. Consequently, the controller may compensate for the excessive temperature variation before the condition adversely affects the compressor. As a result, the useful life of the compressor blades may be extended, thereby decreasing operational costs of the gas turbine engine.

Turning now to the drawings, FIG. 1 is a block diagram of a turbine system 10 including a thermal control system configured to adjust a temperature profile of an air flow into a compressor. The turbine system 10 is described below for the purpose of providing context for embodiments of the present thermal control system. It should be appreciated that the thermal control system described below may be utilized for adjusting temperature profiles of air flows into other axial compressors, such as those used in air separation plants, blast furnaces, or other applications employing compressed air. In addition, while an air flow is described below, it should be appreciated that certain embodiments of the present disclosure may be employed to adjust temperature profiles of other fluid flows (e.g., carbon dioxide, nitrogen, etc.) into a compressor.

In the present embodiment, the turbine system 10 includes a fuel injector 12, a fuel supply 14, and a combustor 16. As illustrated, the fuel supply 14 routes a liquid fuel and/or gas fuel, such as natural gas, to the gas turbine system 10 through the fuel injector 12 into the combustor 16. As discussed below, the fuel injector 12 is configured to inject and mix the fuel with compressed air. The combustor 16 ignites and combusts the fuel-air mixture, and then passes hot pressurized exhaust gas into a turbine 18. As will be appreciated, the turbine 18 includes one or more stators having fixed vanes or blades, and one or more rotors having blades which rotate relative to the stators. The exhaust gas passes through the turbine rotor blades, thereby driving the turbine rotor to rotate. Coupling between the turbine rotor and a shaft 19 will cause the rotation of the shaft 19, which is also coupled to several components throughout the gas turbine system 10, as illustrated. Eventually, the exhaust of the combustion process may exit the gas turbine system 10 via an exhaust outlet 20.

A compressor 22 includes blades rigidly mounted to a rotor which is driven to rotate by the shaft 19. As air passes through the rotating blades, air pressure increases, thereby providing the combustor 16 with sufficient air for proper combustion. The compressor 22 may intake air to the gas turbine system 10 via an inlet 24. Further, the shaft 19 may be coupled to a load 26, which may be powered via rotation of the shaft 19. As will be appreciated, the load 26 may be any suitable device that may use the power of the rotational output of the gas turbine system 10, such as a power generation plant or an external mechanical load. For example, the load 26 may include an electrical generator, a propeller of an airplane, and so forth. As discussed in detail below, the inlet 24 draws air 30 into the gas turbine system 10 via one or more temperature control devices 31, such as an inlet bleed heat system, a fogger system, a chiller system and/or an evaporative cooling system. The air 30 then flows through blades of the compressor 22, which provides compressed air 32 to the combustor 16. In particular, the fuel injector 12 may inject the compressed air 32 and fuel 14, as a fuel-air mixture 34, into the combustor 16. Alternatively, the compressed air 32 and fuel 14 may be injected directly into the combustor for mixing and combustion.

As illustrated, the turbine system 10 includes a thermal control system 36 configured to adjust a temperature profile of an air flow into the compressor 22. In the present embodiment, the thermal control system 36 includes a radiation detector array, such as the illustrated thermal radiation detector array 38, directed toward an air flow through the compressor inlet 24. The thermal radiation detector array 38 is configured to output a signal indicative of a two-dimensional temperature profile of the air flow. For example, as discussed in detail below, the thermal radiation detector array 38 may include multiple thermopile elements, with each element directed toward a different region of the air flow. Because each thermopile element is configured to output a temperature of the respective region, a two-dimensional temperature profile of the air flow may be established. As illustrated, the thermal radiation detector array 38 is directed toward a cross-section 39 of the inlet 24 substantially perpendicular to a direction of the air flow. In this configuration, an entire two-dimensional cross-section of the air flow may be monitored, thereby ensuring that substantially any temperature variation across the air flow will be detected. Furthermore, because the thermal radiation detector array 38 may monitor the air temperature without direct contact with the air, the detector array 38 may be positioned outside of the flow path into the compressor 22, thereby substantially reducing or eliminating the air flow restriction associated with thermocouple measurement.

As will be appreciated, the thermal radiation detector array 38 measures electromagnetic energy from an object to determine a temperature of the object. For example, the detector array 38 may measure thermal radiation having a wavelength within an infrared spectrum. As discussed in detail below, the intensity of certain infrared emissions may be proportional to the temperature of the object. In certain embodiments, the thermal radiation detector array 38 is configured to detect such emissions and output a signal indicative of temperature. It also should be appreciated that various thermal radiation detector array configurations may be employed to determine the two-dimensional temperature profile of the air flow into the compressor 22. As previously discussed, certain detector arrays 38 may include a series of thermopile elements. As will be appreciated, a thermopile includes multiple thermocouples connected in series to obtain an enhanced signal output. Thermocouples measure the temperature difference between hot and cold junctions by generating an electromotive force (emf) between the junctions. For example, the hot junctions may be directed toward the air flow to measure thermal radiation, and the cold junctions may be coupled to a heat sink such that a temperature of the cold junctions is substantially equal to the ambient temperature. Because the thermocouples are connected in series, the thermopile sums the emf of all the thermocouples to provide an enhanced voltage output. Establishing an array of thermopile elements may generate a two-dimensional temperature profile of the air flow, with each thermopile element providing a temperature of a respective monitored region. In certain embodiments, the thermopile array may be a single solid state device, with each thermopile element formed on the surface of the device. Alternative embodiments may employ radiation pyrometers, infrared detectors (e.g., CCD, FPA, etc.) or other thermal radiation detector arrays configured to output a two-dimensional temperature profile of the air flow into the compressor 22.

In the present embodiment, the thermal radiation detector array 38 is communicatively coupled to a controller 40. The controller 40 is configured to detect an excessive temperature variation across the air flow based on a signal indicative of the two-dimensional temperature profile output by the thermal radiation detector array 38. As discussed in detail below, the inlet 24 may include one or more temperature control devices 31 configured to vary a temperature profile of the air flow into the compressor 22. If one of these temperature control devices 31 is not operating properly, a temperature variation may be established within the inlet 24. As previously discussed, such a temperature variation may induce a density gradient within the compressor 22, resulting in premature wear of compressor components. Consequently, the controller 40 may monitor the two-dimensional temperature profile measured by the thermal radiation detector array 38 to determine whether a temperature variation across the air flow exceeds compressor design criteria. As discussed in detail below, the controller 40 may then adjust a parameter of the temperature control device 31 to compensate for the detected temperature variation.

While a single thermal radiation detector array 38 is directed toward the air flow through the inlet 24 in the present embodiment, it should be appreciated that multiple detector arrays 38 may be employed in alternative embodiments to monitor various areas of the inlet 24. For example, certain embodiments may include multiple temperature control devices 31, with a thermal radiation detector array 38 directed toward the air flow downstream from each temperature control device 31. Such embodiments may ensure that each device 31 is providing a substantially even temperature distribution to the air flow. In further embodiments, a series of thermal radiation detector arrays 38 may be disposed along the inlet 24, and configured to monitor multiple cross-sections 39 of the inlet 24. In such embodiments, the controller 40 may generate a three-dimensional temperature profile of the air flow, thereby enabling detection of an excessive temperature variation at substantially any location within the inlet 24.

As previously discussed, the temperature control device 31 may be an inlet bleed heat system, a fogger system, a chiller system, or an evaporative cooling system, among other devices configured to vary a temperature profile of the inlet air flow. In the present embodiment, the controller 40 is communicatively coupled to the temperature control device 31, and configured to adjust a parameter of the device 31 to compensate for a detected temperature variation within the inlet 24. For example, the controller 40 may be configured to detect an excessive temperature variation if a temperature difference between a region of the air flow and an average temperature of the air flow exceeds a threshold value. In such a configuration, the controller 40 may adjust a parameter of the temperature control device 31 to increase or decrease the temperature of the region, thereby substantially reducing the temperature variation across the air flow. In certain embodiments, the temperature control device 31 is a secondary fluid injection system configured to inject a heated or cooled secondary fluid into the air flow. In such embodiments, the controller 40 may be configured to adjust a temperature and/or a flow rate of secondary fluid into the air flow to compensate for the detected excessive temperature variation. Consequently, the thermal control system 36 may establish a substantially even two-dimensional temperature profile across the air flow, thereby substantially reducing or eliminating the possibility of premature compressor wear due to density variations within the compressor 22.

The present embodiment also includes a user interface 42 communicatively coupled to the controller 40. The user interface 42 may include a numerical display configured to display the temperature detected by each element of the thermal radiation detector array 38 and/or a graphical interface configured to display the temperatures as a function of time. In this manner, an operator may monitor the temperature profile to identify an excessive temperature variation. In addition, the user interface 42 may include a visual and/or audible alarm configured to alert the operator of the excessive temperature variation. For example, if the controller 40 determines that a temperature of one region of the air flow is substantially greater than an average air flow temperature, the audible and/or visual alarm may be activated. In certain embodiments, the controller 40 may be communicatively coupled to the gas turbine system 10, and configured to automatically decrease compressor speed and/or shut down the system 10 in response to detection of an excessive temperature variation. In this manner, if the thermal control system 36 is unable to compensate for the excessive temperature variation, air flow into the compressor 22 may be reduced or terminated prior to significant blade wear, thereby ensuring the integrity of the compressor 22.

Figure 2:
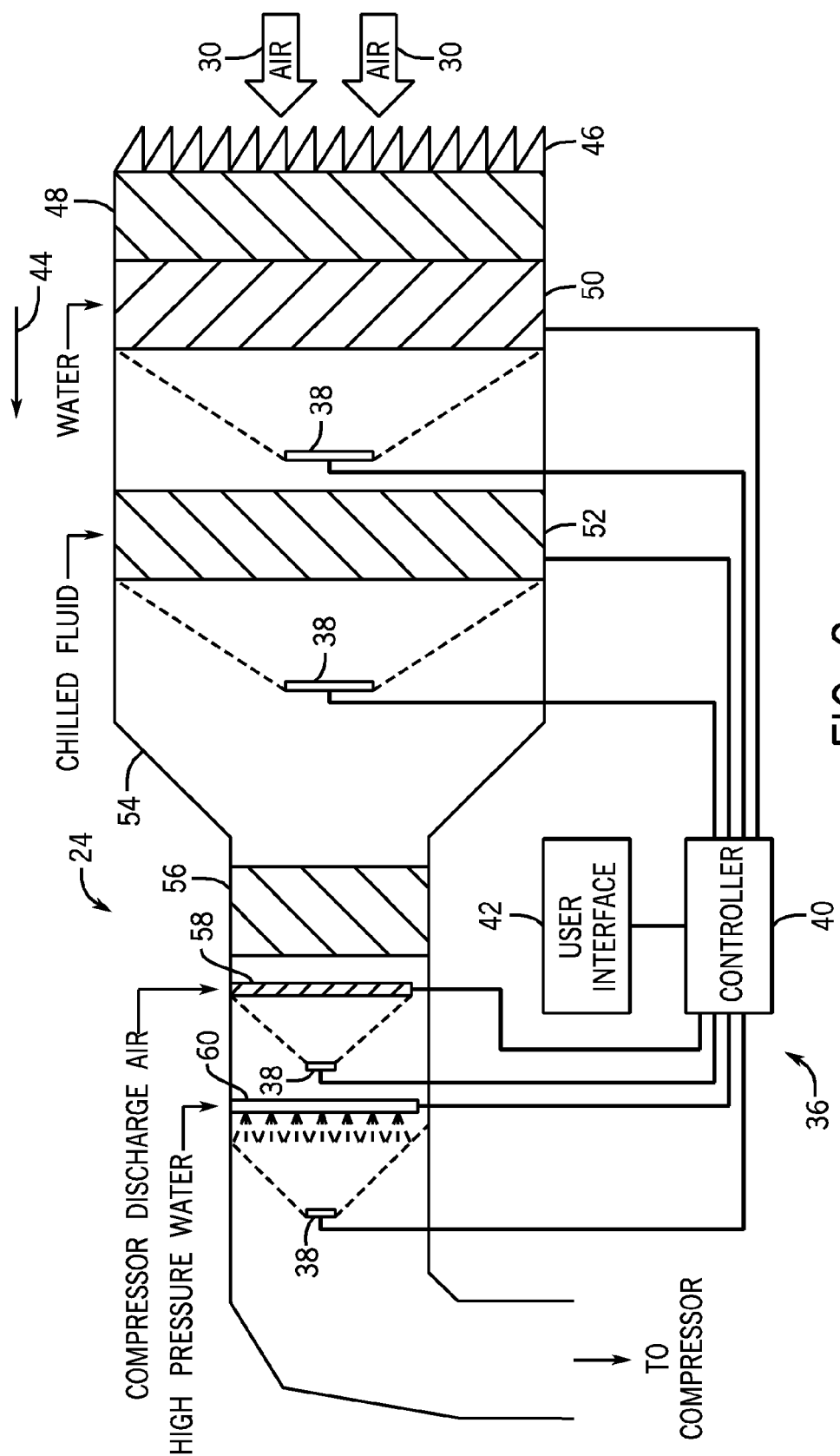
FIG. 2 is a schematic of an embodiment of a compressor inlet configured to provide an air flow to the compressor.

FIG. 2 is a schematic of an embodiment of a compressor inlet 24 configured to provide an air flow to the compressor 22. As illustrated, air 30 enters the inlet 24 and flows toward the compressor 22 along a downstream direction 44. In the present embodiment, the air enters the inlet 24 through a weather hood 46. As will be appreciated, the weather hood 46 includes a series of slats configured to deflect rain drops, sleet and/or snow away from the inlet 24, thereby substantially reducing the moisture content of the incoming air. The air flow then passes through a filter assembly 48 that removes dirt and/or other debris which may otherwise enter the gas turbine system 10.

The inlet 24 also includes a series of temperature control devices 31 configured to increase or decrease the temperature of the air flow into the compressor 22. For example, the illustrated inlet 24 includes an evaporative cooling system 50 which utilizes water to cool the incoming air. Certain evaporative cooling systems spray water onto a porous medium positioned in the flow path of the incoming air. As the air passes through the medium, heat is transferred from the warmer air to the cooler water. In addition, a fraction of the water evaporates, thereby further reducing the air temperature. The evaporative cooling system 50 may also include a mist screen which blocks the flow of residual water droplets into the compressor 22. As illustrated, a thermal radiation detector array 38 is positioned downstream from the evaporative cooling system 50. In this configuration, the detector array 38 measures the two-dimensional temperature profile of the air flow downstream from the evaporative cooling system 50. Consequently, the thermal control system 36 may detect an excessive temperature variation resulting from improper operation of the evaporative cooling system 50.

As illustrated, the controller 40 is communicatively coupled to the evaporative cooling system 50. In this configuration, the controller 40 may adjust a parameter of the evaporative cooling system 50 to compensate for a detected excessive temperature variation within the air flow downstream from the evaporative cooling system 50. For example, if a flow rate of water into the evaporative cooling system 50 is too low, the water may evaporate before reaching each region of the porous medium. Consequently, the temperature of a region receiving sufficient water flow may be lower than the temperature of a region receiving insufficient water flow. If such a temperature variation is detected, the controller 40 may increase the flow rate of water into the evaporative cooling system 50, thereby compensating for the temperature variation and establishing a substantially even temperature distribution across the air flow. Alternatively, a water flow rate to each region of the evaporative cooling system 50 may be independently regulated. In such a configuration, the controller 40 may adjust water flow to each region to establish a two-dimensional temperature profile having a substantially even temperature distribution, thereby compensating for temperature variations upstream of the evaporative cooling system 50.

The inlet 24 also includes a chiller system 52 positioned downstream from the evaporative cooling system 50. The chiller system 52 includes a series of heat transfer coils configured to transfer heat from the air flow to a chilled fluid passing through the coils. The chilled fluid may be water, ethylene glycol or any other suitable fluid. The chilled fluid may be cooled by a mechanical refrigeration system driven by a combustion engine, an electric motor or a steam turbine, for example. The chiller system 52 may be utilized alone or in combination with the evaporative cooling system 50 to decrease the temperature of the air flow into the compressor 22. As will be appreciated, decreasing the air temperature increases the density of the air flow, thereby providing the gas turbine system 10 with additional air for combustion.

Similar to the evaporative cooling system 50 described above, a thermal radiation detector array 38 is positioned downstream from the chiller system 52 to monitor the two-dimensional temperature profile of the air flow from the chiller system 52. In addition, the controller 40 is communicatively coupled to the chiller system 52, and configured to adjust a parameter of the chiller system 52 to compensate for a detected excessive temperature variation. As discussed in detail below, the chiller system 52 may include multiple independently controlled heat transfer coils positioned along the inlet cross-section. By controlling a flow of chilled fluid into each of these heat transfer coils, the two-dimensional temperature profile of the air flow downstream from the chiller system 52 may be varied. Consequently, the controller 40 may compensate for a detected excessive temperature variation within the air flow.

Furthermore, the inlet 24 includes a transition section 54 downstream from the chiller system 52. The transition section 54 is configured to decrease the cross-sectional area of the inlet 24 to substantially match the intake area of the compressor 22. The inlet 24 also includes a silencer section 56 configured to decrease noise associated with operation of the gas turbine system 10. In the present embodiment, an inlet bleed heat system 58 is positioned downstream from the silencer section 56. The inlet bleed heat system 58 is configured to transfer heat from compressor discharge air to air flowing through the inlet 24. As will be appreciated, a temperature of the air flow from the compressor 22 may be greater than approximately 600, 700, 800, or 900 degrees Fahrenheit, or more. Consequently, by directing a portion of the compressor discharge air through a series of pipes within the inlet 24, the inlet bleed heat system 58 may increase the temperature of the air flow into the compressor 24. For example, the inlet bleed heat system 58 may be configured to substantially reduce the possibility of ice formation within the inlet 24 during periods when the turbine system 10 is operating at reduced power. In addition, by heating the air flow into the compressor 22, the inlet bleed heat system 58 may substantially reduce the possibility of back flow through the compressor 22, thereby ensuring the integrity of the gas turbine system 10.

As discussed in detail below, a thermal radiation detector array 38 is positioned downstream from the inlet bleed heat system 58, and is configured to monitor a two-dimensional temperature profile of the air flow downstream from the inlet bleed heat system 58. In addition, the controller 40 is communicatively coupled to the inlet bleed heat system 58, and configured to adjust a parameter of the inlet bleed heat system 58 to compensate for a detected excessive temperature variation. For example, in certain embodiments, the inlet bleed heat system 58 is configured to operate in a choked flow condition. In other words, sufficient compressor discharge air may be injected into the inlet bleed heat system 58 to ensure that the compressor discharge air is substantially evenly distributed throughout the system 58. However, if the flow rate of compressor discharge air into the inlet bleed heat system 58 is insufficient to established choked flow, an uneven distribution of compressor discharge air may be established, thereby resulting in a temperature variation across the inlet air flow downstream from the inlet bleed heat system 58. Consequently, if the controller 40 detects an excessive temperature variation within the air flow, the controller 40 may increase the flow rate of compressor discharge air into the inlet bleed heat system 58, thereby restoring choked flow and establishing a substantially even temperature distribution across the air flow downstream from the inlet bleed heat system 58. Alternatively, a flow rate of compressor discharge air into various regions of the inlet bleed heat system 58 may be independently regulated. In such a configuration, the controller 40 may adjust compressor discharge air flow to each region to establish a two-dimensional temperature profile having a substantially even temperature distribution, thereby compensating for temperature variations upstream of the inlet bleed heat system 58.

In the present embodiment, the inlet 24 also includes a fogger system 60 configured to further cool air flow into the compressor 22. In certain embodiments, the fogger system 60 includes a series of nozzles configured to spray water into the air flow. Similar to the evaporative cooling system 50 described above, heat transfer between the air flow and the water, along with evaporation of the water, serves to decrease the temperature of the air flow. As will be appreciated, the fogger system 60 may be provided with a supply of high pressure water from a pump driven by a combustion engine, an electric motor or a stream turbine, for example.

Another thermal radiation detector array 38 may be positioned downstream from the fogger system 60 to measure a two-dimensional temperature profile of the air flow downstream from the fogger 60. As illustrated, the controller 40 is communicatively coupled to the fogger system 60, and is configured to adjust a parameter of the fogger system 60 to compensate for a detected excessive temperature variation across the air flow downstream from the fogger system 60. For example, in certain embodiments, the fogger system 60 may be divided into a series of regions, with each region including multiple nozzles and a valve controlling water flow to the nozzles. In such embodiments, if the controller 40 detects a temperature difference between one region and an average temperature of the air flow, the controller 40 may increase or decrease water flow to the region to compensate. For example, each valve may be communicatively coupled to the controller 40 such that the controller 40 may regulate a flow through the valve to establish a desired water flow rate into the respective region. In this manner, the thermal control system 36 may automatically adjust the two-dimensional temperature profile of the air flow downstream from the fogger system 60 to ensure that the compressor 22 receives an air flow having a substantially even temperature distribution.

While the illustrated inlet 24 includes an evaporative cooling system 50, a chiller system 52, an inlet bleed heat system 58 and a fogger system 60, it should be appreciated that alternative inlets may include additional temperature control devices 31. For example, as described in detail below, the inlet 24 may include a secondary fluid injection system configured to inject a secondary fluid into the air flow to vary the two-dimensional temperature profile. Further inlets may omit certain of the above described temperature control devices 31. For example, certain embodiments may only include the inlet bleed heat system 58 and the evaporative cooling system 50. As will be appreciated, other inlet configurations may include alternative combinations of temperature control devices 31.

Figure 3:
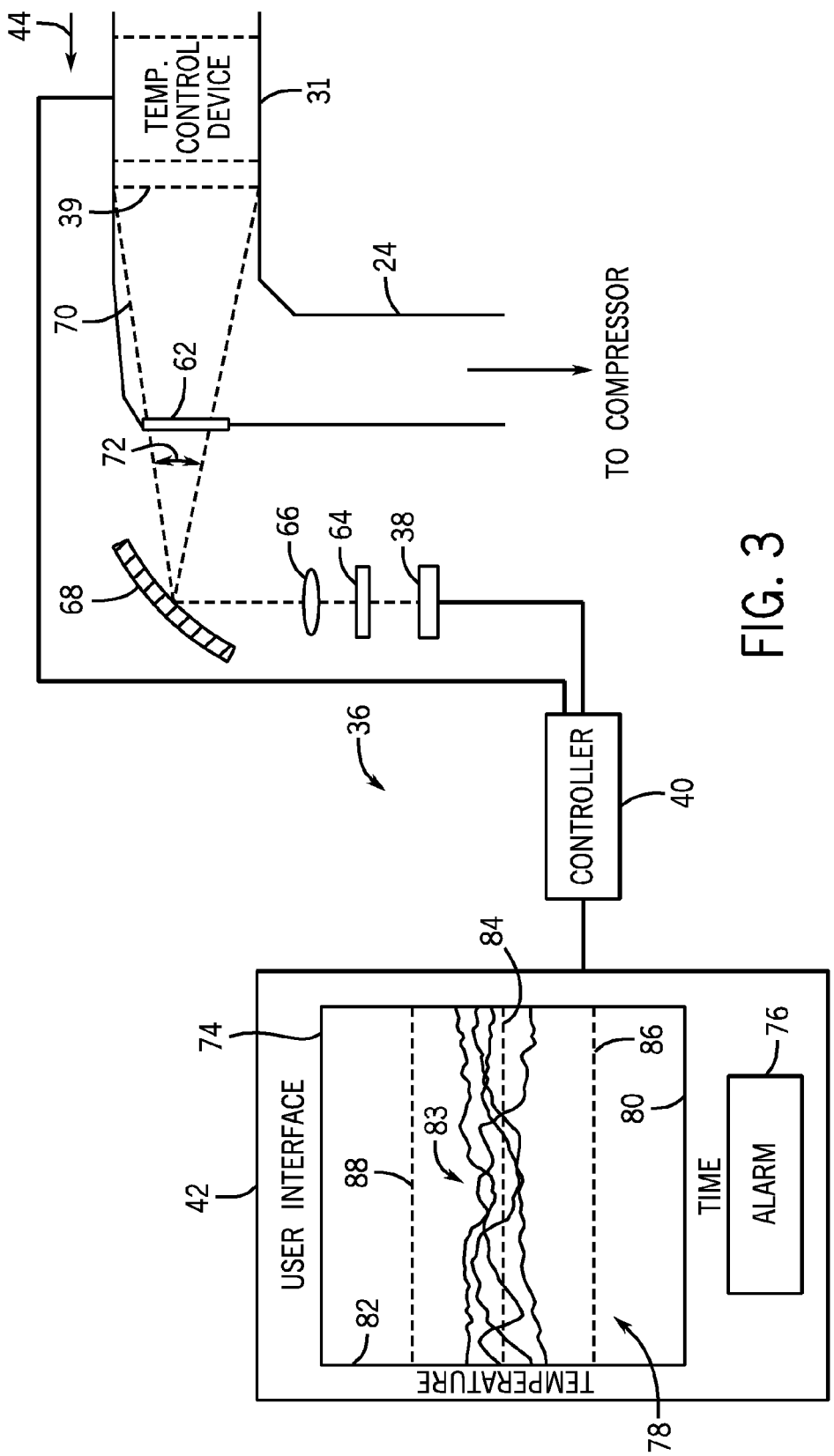
FIG. 3 is a schematic of an embodiment of the thermal control system having a thermal radiation detector array directed toward an air flow through the compressor inlet.

FIG. 3 is a schematic of an embodiment of the thermal control system 36 having a thermal radiation detector array 38 directed toward an air flow through the compressor inlet 24. In the illustrated configuration, the thermal radiation detector array 38 is positioned outside of the inlet 24, thereby ensuring that the air flow is not restricted by the thermal control system 36. As illustrated, the inlet 24 includes a viewing port 62 configured to enable the thermal radiation detector array 38 to receive thermal radiation emitted by the air flow within the inlet 24. As will be appreciated, the viewing port 62 may be composed of a material that is substantially transparent to the wavelengths measured by the array 38. For example, if the detector array 38 is configured to monitor thermal radiation within an infrared spectrum, the viewing port 62 may be composed of a material substantially transparent to infrared radiation, such as sapphire or an infrared-transparent plastic. As a result of this configuration, the thermal radiation detector array 38 may measure a two-dimensional temperature profile of the air flow into the compressor 22 without obstructing the air flow.

In the present embodiment, a filter 64 and a lens 66 are positioned between the viewing port 62 and the thermal radiation detector array 38. In certain embodiments, the detector array 38 may include multiple thermopile elements to measure the thermal radiation emitted by the air flow. In such embodiments, each thermopile element includes multiple thermocouples electrically connected in series to provide an enhanced output signal. As will be appreciated, the thermopile elements may detect a variety of thermal radiation wavelengths. For example, certain thermopile elements may detect electromagnetic wavelengths within the infrared spectrum ranging from approximately 0.8 to 40 microns. As will be further appreciated, a particular subset of wavelengths within the infrared spectrum may be well-suited for temperature determination. Consequently, a band-pass filter 64 may be employed to limit the range of wavelengths incident upon the detector array 38. For example, in certain embodiments, the band-pass filter 64 may be configured to block electromagnetic radiation having a wavelength outside of a range between approximately 2 to 20, 4 to 18, 6 to 16, 8 to 14, or about 7.2 to 12.4 microns. Consequently, the filter 64 facilitates passages of thermal radiation onto the detector array 38 having a wavelength range suitable for each thermopile element to output a signal having a magnitude proportional to the measured temperature. The detector array 38 may aggregate the signals from the thermopile elements, and output a signal to the controller 40 indicative of the two-dimensional temperature profile of the air flow into the compressor 22.

It should be appreciated that alternative embodiments may employ other band-pass filters having other wavelength ranges. Furthermore, certain embodiments may employ a high-pass filter, a low-pass filter, or may omit the filter. Moreover, while a thermal radiation detector array 38 employing thermopile elements is employed in the present embodiment, it should be appreciated that other detector elements, such as CCD, FPA or pyrometer, may be employed in alternative embodiments.

The present thermal control system 36 also includes an optical focusing device, such as the lens 66, configured to focus the thermal radiation onto the detector array 38. As will be appreciated, the lens 66 may be composed of any suitable material, such as plastic or glass. In certain embodiments, the lens 66 may be combined with the filter 64 into a single element. In further embodiments, the lens 66 may be omitted such that thermal radiation passes directly onto the thermal radiation detector array 38.

The present embodiment also includes a second optical focusing device, such as the illustrated mirror 68. The mirror 68 is configured to direct thermal radiation from the air flow onto the thermal radiation detector array 38. In certain embodiments, the mirror 68 may include a substrate (e.g., glass, plastic, etc.) and a reflective coating (e.g., silver, chrome, etc.) disposed onto the substrate. Alternatively, the mirror 68 may be formed from a reflective material, such as polished stainless steel. The present embodiment employs a concave mirror 68 to establish a desired field of view 70. Due to the shape of the mirror 68 and the position of the thermal radiation detector array 38, a field of view 70 having an angle 72 is established. For example, in certain embodiments, the angle 72 may be greater than approximately 5, 10, 20, 40, 60, 80, 100, 120, 140 or 160 degrees, or more. As previously discussed, the thermal radiation detector array 38 may be directed toward the entire cross-section 39 of the inlet 24 to establish a two-dimensional temperature profile of the air flow. Consequently, the angle 72 may be selected such that the field of view 70 includes the entire inlet cross-section 39 at the desired measurement location. As a result, the thermal control system 36 may detect any temperature variation within the air flow, as compared to configurations which employ direct-contact thermocouples that may not detect temperature variations between thermocouples. It should be appreciated that alternative embodiments may employ a convex mirror or a substantially flat mirror to direct the thermal radiation toward the detector array 38. In further embodiments, the mirror 68 may be omitted, and the thermal radiation detector array 38 may be directed toward the air flow. In such embodiments, the lens 66, if present, may serve to establish a desired field of view 70 based on the shape and optical properties of the lens 66.

As previously discussed, the present thermal radiation detector array 38 includes thermopile elements configured to convert detected thermal radiation into an output signal. Because the thermopile elements include multiple thermocouples connected in series, the thermopile elements output an electrical signal having a magnitude proportional to a temperature of the region within the field of view of each respective element. The detector array 38 may aggregate the signals from the thermopile elements, and output a signal to the controller 40 indicative of the two-dimensional temperature profile of the air flow into the compressor 22. The controller 40 is configured to receive this signal, and to determine a two-dimensional temperature profile of the air flow within the inlet cross-section 39 based on the signal (e.g., via a look-up table, an algorithm, etc.). In the present embodiment, the controller 40 is communicatively coupled to a user interface 42 including a display 74 and an alarm 76. The display 74 is configured to present a graphical representation of the temperature detected by each thermopile element as a function of time. As illustrated, the display 74 includes a graph 78 having an x-axis 80 representative of time, and a y-axis 82 representative of temperature. As previously discussed, each thermopile element of the detector array 38 is configured to output a signal indicative of the temperature of a region within the field of view of the element. In the present embodiment, the graph 78 includes a series of curves 83 that represents the temperature of each region as a function of time. The present graph 78 includes four curves 83, indicating that the thermal radiation detector array 38 includes four thermopile elements. However, it should be appreciated that the detector array 38 may include more or fewer elements, resulting in more or fewer curves 83 displayed on the graph 78.

The graph 78 also includes a dashed line 84 indicative of the average temperature of the air flow. As previously discussed, the thermal radiation detector array 38 may be directed toward the entire cross-section 39 of the inlet 24 to monitor the two-dimensional temperature profile of the air flow. By averaging the temperature within each region (e.g., area within the field of view of each thermopile element), the average temperature of the air flow may be computed. In certain embodiments, it may be desirable for the compressor 22 to receive an air flow having temperature variations within a defined range of the average air temperature. Consequently, the controller 40 may be configured to compare the temperature of each region to the average temperature to determine whether an excessive temperature variation is present. In such embodiments, the graph 78 includes a lower threshold 86 and an upper threshold 88 corresponding to the desired air temperature range. For example, it may be desirable for certain compressors to receive air within a 10, 9, 8, 7, 6, 5, 4, 3, or 2 degree Fahrenheit, or less, range of the average air temperature. In such configurations, the controller 40 may identify an excessive temperature variation within the inlet 24 if a temperature within one region exceeds the upper threshold 88 or decreases below the lower threshold 86. Alternatively, the upper threshold 88 and the lower threshold 86 may be defined based on a percentage difference between the detected temperature and the average temperature. For example, in certain embodiments, it may be desirable the compressor 22 to receive air within a 15%, 12%, 10%, 8%, 6%, 4%, or less, range of the average air temperature.

In alternative embodiments, the controller 40 may be configured to detect an excessive temperature variation within the air flow into the compressor 22 by comparing a temperature difference between regions to a threshold value. In such embodiments, the display 74 may be configured to show a single curve indicative of a difference between the maximum detected temperature of a region and the minimum detected temperature of a region. The graph may also include a threshold indicative of the maximum desired temperature variation. If the temperature difference between the maximum detected temperature and the minimum detected temperature exceeds the threshold value, the controller 40 may identify an excessive temperature variation within the air flow. For example, the threshold value indicative of an excessive temperature variation may be less than approximately 20, 17, 15, 12, 10, 8, 6, 4, or 2 degrees Fahrenheit, or less, for certain compressor configurations. Alternatively, the threshold value may be defined as a percentage difference between the minimum and maximum detected temperatures. In such a configuration, the threshold value may correspond to a 30%, 25%, 20%, 15%, 10%, 5%, or less, percentage difference.

If an excessive temperature variation is detected, the controller 40 may send a signal to the temperature control device 31 instructing the temperature control device 31 to vary a two-dimensional temperature profile of the air flow to compensate for the detected excessive temperature variation. Specifically, the controller 40 may instruct the temperature control device 31 to increase or decrease a temperature of a region such that the temperature of the region falls within the desired range (e.g., within a tolerance of the average air flow temperature). Alternatively, the controller 40 may instruct the temperature control device 31 to increase a temperature of the coldest region and/or decrease a temperature of the hottest region to reduce the temperature difference below the threshold value. In this manner, the thermal control system 36 may provide a substantially even temperature distribution to the compressor 22, thereby substantially reducing the possibility of excessive blade wear.

If the controller 40 is unable to compensate for the detected excessive temperature variation, the controller 40 may activate the alarm 76 within the user interface 42. As previously discussed, the alarm 76 may be an audible alarm and/or a visual alarm configured to alert an operator of the detected condition. The operator may then take appropriate corrective action to resolve the air temperature variation. In addition, the controller 40 and/or the user interface 42 may be communicatively coupled to the gas turbine engine 10, and configured to decrease compressor speed and/or deactivate the engine if the controller 40 is unable to compensate for the excessive temperature variation via operation of the temperature control device 31. For example, in certain embodiments, if the temperature variation exceeds a first threshold value, the controller 40 may reduce engine power, thereby decreasing compressor speed. If the temperature variation exceeds a second threshold value, higher than the first threshold value, the controller 40 may deactivate the gas turbine engine 10. Such actions may substantially extend the operational life of the compressor blades, thereby decreasing turbine engine maintenance costs.

Figure 4:
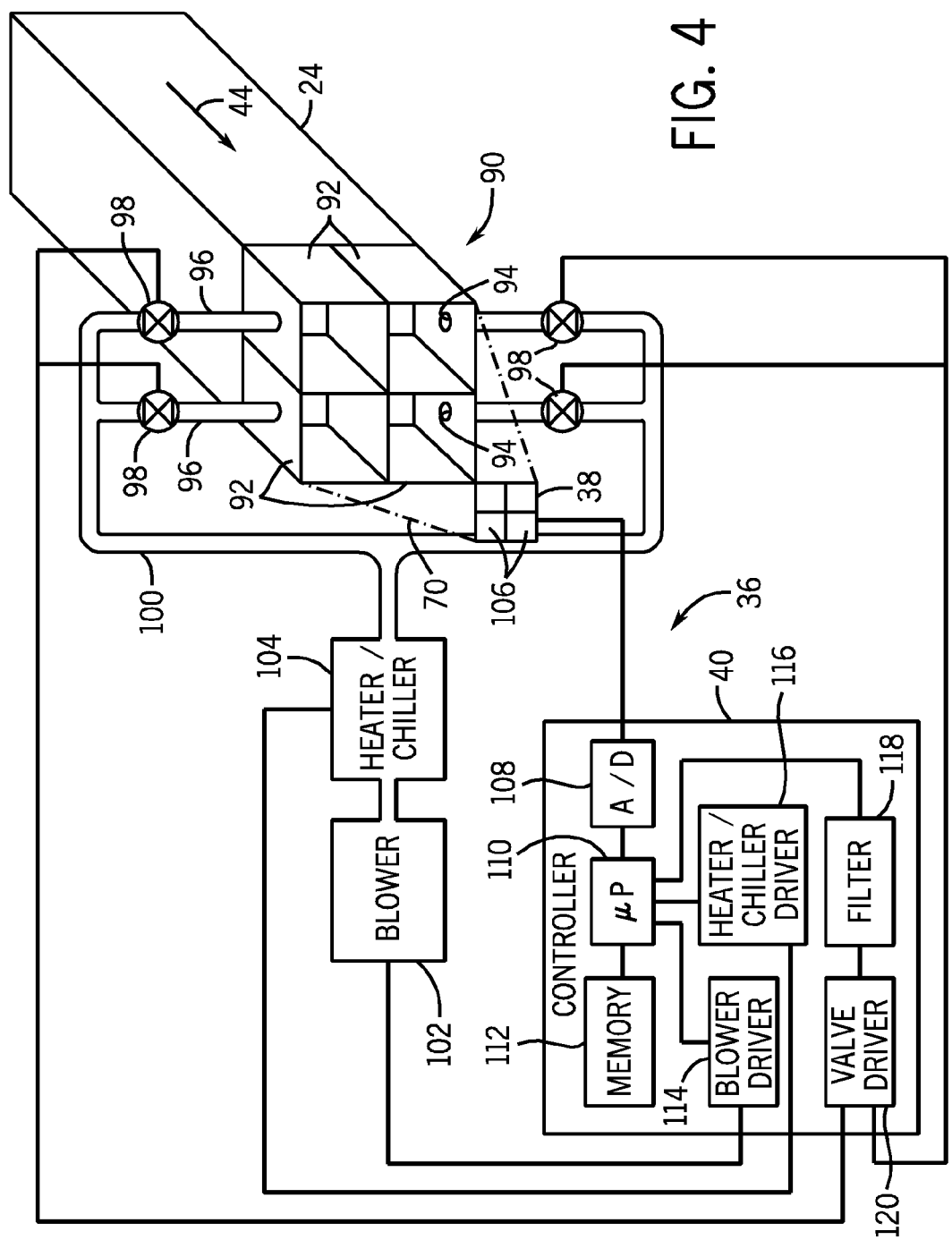
FIG. 4 is a schematic of an embodiment of the thermal control system including a secondary fluid injection system configured to adjust a temperature profile of the air flow through the compressor inlet.

FIG. 4 is a schematic of an embodiment of the thermal control system 36 including a secondary fluid injection system 90 configured to adjust a temperature profile of the air flow through the compressor inlet 24. Specifically, the secondary fluid injection system 90 is configured to inject a secondary fluid into the inlet 24, thereby varying a two-dimensional temperature profile of the air flow. In the present embodiment, the secondary fluid injection system 90 includes four cells 92, each configured to inject the secondary fluid into the air flow. By varying a temperature and/or flow rate of secondary fluid into each cell 92, the two-dimensional temperature profile of the air flow may be adjusted to compensate for a detected excessive temperature variation. While four cells 92 are employed in the present embodiment, it should be appreciated that alternative embodiments may include more or fewer cells 92. For example, certain embodiments may include 2, 3, 4, 5, 6, 7, 8, 9, 10, or more cells 92. As will be appreciated, the accuracy of the two-dimensional temperature profile may be at least partially dependent on the number of cells 92 utilized within the secondary fluid injection system 90.

In certain embodiments, the secondary fluid injection system 90 may be positioned downstream from the evaporative cooling system 50, the chiller system 52, the inlet bleed heat system 58 and the fogger system 60. In this position, the secondary fluid injection system 90 may compensate for temperature variations induced by each of the upstream temperature control devices 31. In the present embodiment, the secondary fluid injection system 90 is configured to inject heated or cooled air into the air flow along the downstream direction 44. However, it should be appreciated that alternative secondary fluids (e.g., carbon-dioxide, nitrogen, etc.) may be injected in alternative embodiments.

As illustrated, each cell 92 includes an opening 94 configured to receive a flow of secondary air from a respective conduit 96. A valve 98 coupled to each conduit 96 is configured to control a flow of secondary air from a header 100 to each cell 92. As discussed in detail below, each valve 98 is communicatively coupled to the controller 40 such that the controller 40 may regulate a flow of secondary air into each cell 92. In the present embodiment, a blower 102 and a heater/chiller 104 are in fluid communication with the header 100. The blower 102 is configured to provide a flow of secondary air to the cells 92, while the heater/chiller 104 is configured to adjust a temperature of the secondary air. As will be appreciated, the blower 102 may be driven by a combustion engine, an electric motor or a steam turbine, for example. Furthermore, the heater/chiller 104 may include an electric heating unit, a mechanical refrigeration system, a heat exchanger, or other device configured to vary the temperature of the secondary air provided by the blower 102. In alternative embodiments, the header 100 may be coupled to the compressor 22, and configured to receive a flow of compressor discharge air. In further embodiments, the header 100 may be coupled to a steam source such that steam may be injected into each cell 92 to compensate for a temperature variation across the air flow.

The illustrated thermal radiation detector array 38 is directed toward the secondary fluid injection system 90 such that the entire cross-section of the air flow downstream from the secondary fluid injection system 90 falls within the field of view 70 of the detector array 38. As previously discussed, the thermal radiation detector array 38 may include multiple thermopile elements 106, with each thermopile element directed toward a different region of the air flow cross-section. In this configuration, the thermal radiation detector array 38 may output a signal indicative of the temperature of each region such that the controller 40 may establish a two-dimensional temperature profile of the air flow.

In the present embodiment, the thermal radiation detector array 38 includes a 2×2 matrix of thermopile elements 106. In this configuration, each element 106 of the thermal radiation detector array 38 may be directed toward a respective cell 92 such that a temperature of the air flowing downstream from each cell 92 may be independently monitored. However, it should be appreciated that alternative thermal radiation detector arrays 38 may include more or fewer thermopile elements 106. For example, certain thermal radiation detector arrays 38 may include more than 1, 2, 4, 6, 8, 10, 15, 20, 25, 30, or more rows and/or more than 1, 2, 4, 6, 8, 10, 15, 20, 25, 30, or more columns. It should also be appreciated that certain thermal radiation detector arrays 38 may be circular, elliptical or polygonal, among other shapes, with the thermopile elements 106 substantially covering the surface of the detector array 38. Furthermore, it should be appreciated that alternative thermal radiation sensors (e.g., CCD, FPA, pyrometer, etc.) may form elements of the thermal radiation detector array 38.

As will be appreciated, the overall sensitivity of the thermal control system 36 may be dependent on the sensitivity of the thermopile elements 106, the accuracy of the thermal radiation detector array 38, optical and/or electrically noise within the system 36, the accuracy of a signal conditioner within the controller 40, the quality of the thermal radiation sensor optics, the field of view of each thermopile element and/or the techniques used by the controller 40 to compute temperature, among other factors. For example, in certain embodiments, the thermal control system 36 may be able to identify temperature variations of less than approximately 2, 1, 0.75, 0.5, or 0.25 degrees Fahrenheit, or less. Consequently, the thermal control system 36 may detect and compensate for thermal variations within the air flow prior to excessive wear of the compressor blades, thereby substantially reducing compressor maintenance costs. Because the sensitivity of the thermal control system 36 is at least partially dependent on the field of view of each thermopile element 106, it should be appreciated that thermal control system sensitivity may be enhanced by employing a larger number of thermopile elements 106. In this manner, each thermopile element 106 will monitor a smaller region of the air flow, thereby increasing the sensitivity of each element 106.

As illustrated, the thermal radiation detector array 106 is communicatively coupled to an analog-to-digital converter (A/D) 108 within the controller 40. As will be appreciated, the analog-to-digital converter 108 is configured to convert an analog signal indicative of the two-dimensional temperature profile into a digital signal that may be processed by a microprocessor (µP) 110. The microprocessor 110 is configured to receive the digital signal indicative of the two-dimensional temperature profile, to identify an excessive temperature variation, and to adjust a parameter of the secondary fluid injection system 90 to compensate for the excessive temperature variation. A memory 112, communicatively coupled to the microprocessor 110, may include instructions associated with the excessive temperature variation detection and compensation process and/or may serve as a temporary storage location.

In the present embodiment, the microprocessor 110 is communicatively coupled to a blower driver 114 configured to vary an air flow rate from the blower 102. The microprocessor 110 is also communicatively coupled to a heater/chiller driver 116 configured to vary heat transfer between the heater/ chiller 104 and the air flow from the blower 102. Furthermore, the controller 110 is communicatively coupled to a filter 118 and a valve driver 120. The valve driver 120 is configured to control the position of each valve 98, while the filter 118 limits the rate of valve movement to protect the integrity of the valves 98. As will be appreciated, injecting secondary air into the inlet air flow transfers heat between the secondary air and the inlet air, thereby varying the temperature of the inlet air. As will be further appreciated, the degree of heat transfer is at least partially dependent upon the temperature of the secondary air and the flow rate of secondary air into the inlet 24. Consequently, the microprocessor 110 may be configured to adjust the flow rate and/or temperature of the secondary air to compensate for detected excessive temperature variations within the air flow through the inlet 24.

For example, if a temperature difference between one of the four regions monitored by the illustrated thermal radiation detector array 38 and an average temperature of the air flow exceeds a threshold value, the controller 40 may adjust the secondary air flow into the inlet 24 to compensate. In one embodiment, the microprocessor 110 may compute a degree of heat transfer sufficient to decrease the temperature difference below the threshold value. The microprocessor 110 may then send a signal to the blower driver 114, the heater/chiller driver 116 and/or the valve driver 120 instructing the drivers 114, 116 and/or 120 to establish the desired degree of heat transfer. In turn, the blower driver 114 may instruct the blower 102 to provide the desired air flow rate, the heater/chiller driver 116 may instruct the heater/chiller 104 to vary the temperature of the secondary air flow to the desired temperature, and the valve driver 120 may open the valve 98 associated with the region having the anomalous temperature. In this manner, the controller 40 may compensate for a detected excessive temperature variation within the air flow by adding or removing heat from the region via the secondary fluid injection system 90.

While the controller 40 controls a blower 102, heat exchanger 104 and valves 98 in the present embodiment, it should be appreciated that the controller 40 may control other parameters of the secondary fluid injection system 90 in alternative embodiments. For example, in embodiments in which the secondary fluid injection system 90 injects compressor discharge air into the inlet 24, the controller 40 may actuate a series of valves to control the flow rate of the compressor discharge air. In further embodiments, the controller 40 may be configured to select different fluid sources depending on the desired degree of heat transfer. For example, the controller 40 may select compressor discharge air to heat an excessively cold region, and chilled air from a blower/chiller system to cool an excessively hot region. In this manner, the thermal control system 36 may compensate for excessive temperature variations, thereby substantially reducing density variations within the compressor 22 and increasing the operational life of compressor components.

FIG. 5 is a schematic of an embodiment of the thermal control system 36 configured to adjust a flow of compressor discharge air into the inlet bleed heat system 58. As previously discussed, the inlet bleed heat system 58 is configured to transfer heat from the compressor discharge air to air flowing through the inlet 24. Consequently, the inlet bleed heat system 58 may substantially reduce the possibility of ice formation within the inlet 24 during periods when the turbine system 10 is operating at reduced power. In addition, by heating the air flow into the compressor 22, the inlet bleed heat system 58 may substantially reduce the possibility of back flow through the compressor 22, thereby ensuring the integrity of the gas turbine system 10.

As illustrated, the inlet bleed heat system 58 includes a distribution header 121 and heating tubes 122. In the illustrated configuration, the distribution header 121 receives the air flow from the compressor and distributes the air to the heating tubes 122. In certain embodiments, the temperature of the air flow from the compressor 22 may be greater than approximately 600, 700, 800, or 900 degrees Fahrenheit, or more. Consequently, as air flowing through the inlet 24 in the downstream direction 44 contacts the heating tubes 122, heat from the compressor discharge air is transferred to the air flow within the inlet 24. As will be appreciated, the degree of heat transfer to the inlet air may be at least partially dependent on the number of heating tubes 122. While four heating tubes 122 are employed in the present embodiment, it should be appreciated that more or fewer tubes 122 may be utilized in alternative embodiments. For example, certain inlet bleed heat systems 58 may include more than 1, 2, 3, 4, 5, 10, 15, 20, 25, 30, or more tubes 122.

As illustrated, the thermal radiation detector array 38 is directed toward the inlet bleed heat system 58 such that the entire cross-section of the air flow downstream from the inlet bleed heat system 58 falls within the field of view 70 of the detector array 38. In this manner, the detector array 38 may monitor the two-dimensional temperature profile of the air flow downstream from the inlet bleed heat system 58, thereby ensuring that substantially any temperature variation induced by the inlet bleed heat system 58 will be detected. As previously discussed, the thermal radiation detector array 38 may include multiple thermopile elements 106, with each thermopile element directed toward a different region of the air flow cross-section. In this configuration, the thermal radiation detector array 38 may output a signal indicative of the temperature of each region such that the controller 40 may establish a two-dimensional temperature profile of the air flow.

In the present embodiment, the thermal radiation detector array 38 includes a 4-by-4 matrix of thermopile elements 106. In this configuration, each column of the thermal radiation detector array 38 may be directed toward a respective heating tube 122 such that a temperature of the air flowing downstream from each heating tube 122 may be independently monitored. However, as previously discussed, alternative thermal radiation detector arrays 38 may include more or fewer thermopile elements 106.

Similar to the thermal control system 36 described above with reference to FIG. 3, the illustrated thermal control system 36 includes a user interface 42 communicatively coupled to the controller 40. The illustrated user interface 42 includes a numerical display 124 configured to present a numerical representation of the temperature of each region within the field of view 70 of the detector array 38. In the present embodiment, the display 124 is configured to output a temperature difference between each monitored region and an average temperature of the air flow. It should be appreciated, that alternative embodiments may include a display 124 configured to present the absolute temperature of each region. In the present embodiment, the temperature values are shown in degrees Fahrenheit.

As previously discussed, the controller 40 may be configured to detect an excessive temperature variation within the air flow by comparing the temperature difference between each monitored region and the average air flow temperature to a threshold value. In the illustrated embodiment, the threshold value is 5 degrees Fahrenheit, which corresponds to the maximum desired temperature variation within the air flow to the compressor 22. As previously discussed, a higher or lower threshold value may be employed in alternative embodiments. Because the illustrated thermal radiation detector array 38 includes four rows of thermopile elements 106, each row measures the air flow temperature downstream from a respective heating tube 122. As illustrated, each temperature within the left column of the display 124 indicates a temperature difference of less than 5 degrees from the average temperature. Similarly, each temperature difference within the right column and the column second from the left are within the 5 degree tolerance. Consequently, the display 124 indicates that the corresponding heating tubes 122 are not inducing an excessive temperature variation. In contrast, the temperature measurements corresponding to the second heating tube 122 from the right indicate that the tube 122 is not effectively heating the surrounding air. Specifically, the temperature of each region corresponding to the air flow downstream from the second heating tube 122 from the right is more than 5 degrees lower than the average temperature. Therefore, the controller 40 will detect the excessive temperature variation, and adjust a parameter of the inlet bleed heat system 58 to compensate.

In the present embodiment, the header 121 is supplied with the compressor discharge air via a conduit 126 extending between the compressor 22 and the inlet bleed heat system 58. As illustrated, a valve 128 is coupled to the conduit 126 and configured to regulate a flow of compressor discharge air into the inlet bleed heat system 58. As previously discussed, the inlet bleed heat system 58 is configured to operate in a choked flow condition. Consequently, if the flow rate of compressor discharge air into the inlet bleed heat system 58 is insufficient to established choked flow, an uneven distribution of compressor discharge air may be established. Such an uneven compressor discharge air distribution may result in the detected excessive temperature variation associated with the second heating tube 122 from the right. To compensate for the detected excessive temperature variation, the controller 40 may restore choked flow through the inlet bleed heat system 58 by increasing the flow rate of compressor discharge air into the header 121. Specifically, the controller 40 may instruct the valve 128 to enable a higher flow rate of compressor discharge air into the inlet bleed heat system 58, thereby establishing choked flow and substantially reducing or eliminating the detected excessive temperature variation. However, if the controller 40 is unable to decrease the temperature variation below the threshold valve (e.g., 5 degrees Fahrenheit), the controller 40 may instruct the user interface to activate the alarm 76, reduce compressor speed and/or deactivate the compressor 22.

In alternative embodiments, a flow rate of compressor discharge air into each heating tube 122 may be independently regulated. In such a configuration, the controller 40 may adjust compressor discharge air flow to each tube 122 to establish a two-dimensional temperature profile having a substantially even temperature distribution, thereby compensating for temperature variations upstream of the inlet bleed heat system 58. For example, the controller 40 may instruct the inlet bleed heat system 58 to provide additional compressor discharge air to the second heating tube 122 from the right to compensate for the detected temperature variation.

FIG. 6 is a schematic of an embodiment of the thermal control system 36 configured to adjust a flow of chilled fluid into a chiller system 52. As illustrated, the chiller system 52 includes three heat transfer coils 130 configured to transfer heat from the inlet air to chilled fluid circulating within the coils 130. As previously discussed, the chilled fluid may be generated by a mechanical refrigeration system, for example. While three heat transfer coils 130 are employed in the present embodiment, it should be appreciated that more or fewer coils 130 may be utilized in alternative embodiments. For example, certain chiller systems 52 may employ 1, 2, 3, 4, 5, 6, or more heat transfer coils 130.

As illustrated, the heat transfer coils 130 are arranged horizontally across the inlet 24. In this configuration, one or more rows of thermopile elements 106 are directed toward the air flow downstream from each heat transfer coil 130. For example, the top two rows of elements 106 are directed toward the top heat transfer coil 130. In the present embodiment, the display 124 is configured to output a temperature difference between each monitored region and an average temperature of the air flow. As can be seen on the display 124, the air temperature within a region monitored by the top two rows is elevated compared to the air temperature within a region monitored by the bottom two rows. Specifically, each thermopile element 106 within the top row is detecting an air temperature more than 5 degrees higher than the average air temperature within the inlet 24. Such a temperature variation may indicate that the top heat transfer coil 130 is not operating effectively. Consequently, the controller 40 will detect an excessive temperature variation within the air flow to the compressor 22, and adjust a parameter of the chiller system 52 to compensate.

As illustrated, a manifold 132 provides each heat transfer coil 130 with a supply of chilled fluid. The manifold 132 includes a series of valves 134 configured to independently regulate the flow of chilled fluid to each heat transfer coil 130. In the present embodiment, each valve 134 is communicatively coupled to the controller 40 such that the controller 40 may adjust chilled fluid flow into each heat transfer coil 130 based on the measured two-dimensional temperature profile of the air flow downstream from the chiller system 52. In the illustrated configuration, a temperature difference between the air flow downstream from the top heat transfer coil 130 and the average air flow temperature is greater than the tolerance (e.g., 5 degrees Fahrenheit). Consequently, the controller 40 may instruct the valve 134 supplying the top heat transfer coil 130 to increase flow of chilled fluid. As a result, the temperature of the air flow downstream from the top heat transfer coil 130 may decrease, thereby substantially reducing or eliminating the detected excessive temperature variation. However, if the controller 40 is unable to decrease the temperature variation below the threshold valve (e.g., 5 degrees Fahrenheit), the controller 40 may instruct the user interface to activate the alarm 76, reduce compressor speed and/or deactivate the compressor 22. While FIGS. 4 and 5 illustrate a thermal control system 36 configured to compensate for a temperature variation downstream from the inlet bleed heat system 58 and the chiller system 52, respectively, it should be appreciated that a similar configuration may be employed to compensate for temperature variations downstream from the evaporative cooling system 50, the fogger system 60, or other temperature control devices 31 within the inlet 24.

Figure 7:
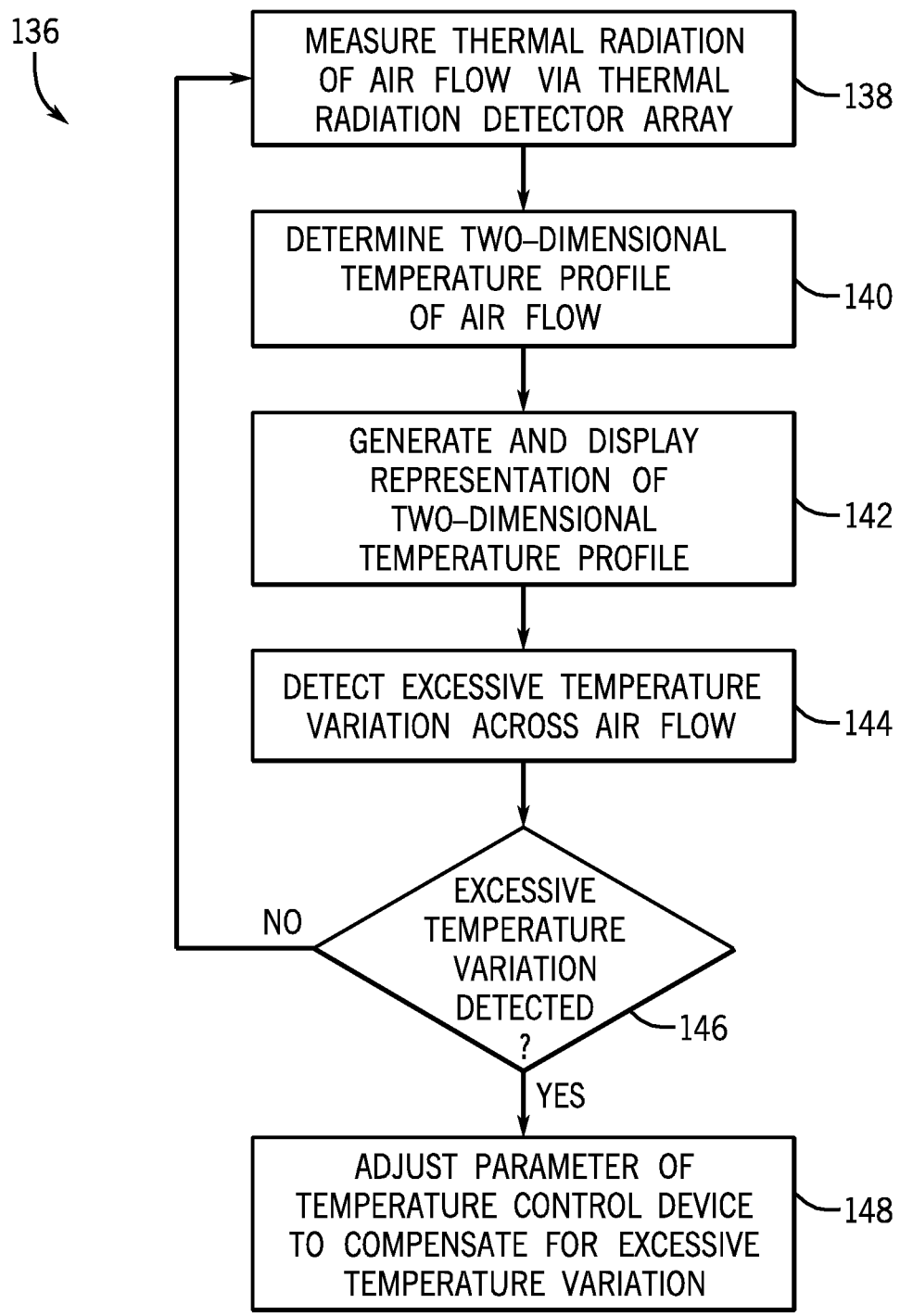
FIG. 7 is a flowchart of an embodiment of a method for adjusting a temperature profile of an air flow through the compressor inlet.

FIG. 7 is a flowchart of an embodiment of a method 136 for adjusting a temperature profile of an air flow through the compressor inlet 24. First, as represented by block 138, thermal radiation of the air flow is measured via the thermal radiation detector array 38. As previously discussed, the thermal radiation detector array 38 may include multiple thermopile elements, each directed toward a different region of the air flow. Each thermopile element is configured to output a signal having a magnitude proportional to the temperature of the respective region. The thermal radiation detector array 38 is configured to aggregate the signals from each element, and to output the resultant signal to the controller 40. Next, as represented by block 140, a two-dimensional temperature profile of the air flow is determined based on the thermal radiation measurement. For example, the controller 40 may receive the resultant signal from the thermal radiation detector array 38, and determine the two-dimensional temperature profile based on the magnitude of each thermopile element signal. A representation of the two-dimensional temperature profile may then be generated and displayed, as represented by block 142. For example, the display 74 may present a series of curves 83 showing the temperature of each region as a function of time. Alternatively, the display 124 may present a numerical representation of the temperature of each region.

Next, as represented by block 144, an excessive temperature variation across the air flow may be detected based on the two-dimensional temperature profile. For example, the controller 40 may be configured to detect the excessive temperature variation if a temperature difference between a region of the air flow and an average temperature of the air flow exceeds a threshold value. Alternatively, the controller 40 may be configured to detect the excessive temperature variation if a temperature difference between a first region of the air flow and a second region of the air flow exceeds a threshold value. If an excessive temperature variation is detected, as represented by block 146, a parameter of a temperature control device 31 may be adjusted to compensate for the excessive temperature variation, as represented by block 148. For example, the controller 40 may increase a flow of compressor discharge air into the inlet bleed heat system 58 to establish a choked flow that evenly distributes the compressor discharge air throughout the system 58. In addition, the controller 40 may regulate a flow of chilled fluid into certain heat transfer coils 130 of the chiller system 52 to establish a substantially even temperature distribution within the air flow downstream from the chiller system 52. Furthermore, the controller 40 may vary a temperature and/or flow rate of secondary fluid into certain cells 92 of the secondary fluid injection system 90 to compensate for the detected excessive temperature variation. Such temperature control devices 31 may be regulated individually or in combination to substantially reduce or eliminate the detected excessive temperature variation.

It should be appreciated that the controller 40 may initiate alternative actions if an excessive temperature variation across the air flow is detected. For example, the controller 40 may adjust flow into the evaporative cooling system 50 or the fogger system 60 to compensate for an excessive temperature variation detected downstream from the respective temperature control device 31. Alternatively, if the controller 40 is unable to decrease the temperature variation below the threshold valve, the controller 40 may instruct the user interface 42 to activate the alarm 76 and/or deactivate the compressor 22. In further embodiments, the controller 40 may adjust the operation of the compressor (e.g., decrease compressor speed) to mitigate blade wear that may otherwise result from the excessive temperature variation.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system comprising:
a radiation detector array directed toward a fluid flow into a compressor, wherein the radiation detector array is configured to output a signal indicative of a two-dimensional temperature profile of the fluid flow; and
a controller communicatively coupled to the radiation detector array, wherein the controller is configured to detect a temperature variation across the fluid flow based on the signal, and to adjust a parameter of a temperature control device to compensate for the detected temperature variation.

2. The system of claim 1, wherein the radiation detector array comprises a plurality of thermopile elements.

3. The system of claim 1, wherein the radiation detector array is configured to detect thermal radiation having a wavelength within an infrared spectrum.

4. The system of claim 1, comprising an optical focusing device configured to focus thermal radiation from the fluid flow onto the radiation detector array.

5. The system of claim 1, wherein the controller is configured to detect the temperature variation if a first temperature difference between a first region of the fluid flow and an average temperature of the fluid flow exceeds a first threshold value, if a second temperature difference between the first region of the fluid flow and a second region of the fluid flow exceeds a second threshold value, or a combination thereof.

6. The system of claim 5, wherein the temperature control device is configured to vary a first temperature of the first region of the fluid flow, to vary a second temperature of the second region of the fluid flow, or a combination thereof, to decrease the first temperature difference below the first threshold value, to decrease the second temperature difference below the second threshold value, or a combination thereof.

7. The system of claim 1, wherein the temperature control device comprises an inlet bleed heat system, a fogger system, a chiller system, an evaporative cooling system, or a combination thereof.

8. The system of claim 1, wherein the temperature control device comprises a secondary fluid injection system configured to inject a heated or cooled secondary fluid into the fluid flow.

9. The system of claim 8, wherein the parameter of the temperature control device comprises a temperature of the secondary fluid, a flow rate of the secondary fluid, or a combination thereof.

10. The system of claim 1, comprising a gas turbine engine having the compressor.

11. A system comprising:
an inlet configured to provide an air flow to a compressor;
a temperature control device in fluid communication with the inlet, wherein the temperature control device is configured to vary a two-dimensional temperature profile of the air flow;
a radiation detector array directed toward a cross-section of the inlet downstream from the temperature control device and substantially perpendicular to a direction of the air flow, wherein the radiation detector array is configured to output a signal indicative of the two-dimensional temperature profile of the air flow; and
a controller communicatively coupled to the radiation detector array and the temperature control device, wherein the controller is configured to detect a temperature variation across the air flow based on the signal, and to adjust a parameter of the temperature control device to compensate for the detected temperature variation.

12. The system of claim 11, wherein the radiation detector array comprises a plurality of thermopile elements.

13. The system of claim 11, wherein the controller is configured to detect the temperature variation if a temperature difference between a region of the two-dimensional temperature profile and an average temperature of the two-dimensional temperature profile exceeds a threshold value.

14. The system of claim 13, wherein the temperature control device is configured to vary a temperature of the region to decrease the temperature difference below the threshold value.

15. The system of claim 11, wherein the temperature control device comprises an inlet bleed heat system, a fogger system, a chiller system, an evaporative cooling system, a secondary fluid injection system, or a combination thereof.

16. A method comprising:
   measuring thermal radiation of an air flow into a compressor via a radiation detector array;
   determining a two-dimensional temperature profile of the air flow based on the measurement;
   detecting a temperature variation across the air flow based on the two-dimensional temperature profile; and
   adjusting a parameter of a temperature control device to compensate for the detected temperature variation.

17. The method of claim 16, wherein detecting the temperature variation across the air flow comprises:
   computing a first temperature difference between a first region of the air flow and an average temperature of the air flow, computing a second temperature difference between the first region of the air flow and a second region of the air flow, or a combination thereof; and
   comparing the first temperature difference, the second temperature difference, or a combination thereof, to a threshold value indicative of the temperature variation.

18. The method of claim 16, wherein adjusting the parameter of the temperature control device comprises adjusting a fluid flow into an inlet bleed heat system, a fogger system, a chiller system, an evaporative cooling system, or a combination thereof.

19. The method of claim 16, wherein adjusting the parameter of the temperature control device comprises adjusting a flow rate of secondary fluid into the air flow, adjusting a temperature of the secondary fluid, or a combination thereof.

20. The method of claim 16, comprising generating and displaying a graphical or numerical representation of the two-dimensional temperature profile of the air flow.

* * * * *